US011860577B2

(12) United States Patent
Stranczl et al.

(10) Patent No.: US 11,860,577 B2
(45) Date of Patent: Jan. 2, 2024

(54) VARIABLE-GEOMETRY TIMEPIECE DISPLAY MECHANISM WITH RESILIENT HAND

(71) Applicant: Montres Breguet S.A., L'Abbaye (CH)

(72) Inventors: Marc Stranczl, Nyon (CH); Jan Pittet, Le Sentier (CH)

(73) Assignee: Montres Breguet S.A., L'Abbaye (CH)

( * ) Notice: Subject to any disclaimer, the term of this patent is extended or adjusted under 35 U.S.C. 154(b) by 740 days.

(21) Appl. No.: 16/965,766

(22) PCT Filed: Jul. 24, 2019

(86) PCT No.: PCT/EP2019/069949
§ 371 (c)(1),
(2) Date: Jul. 29, 2020

(87) PCT Pub. No.: WO2020/025424
PCT Pub. Date: Feb. 6, 2020

(65) Prior Publication Data

US 2021/0026305 A1 Jan. 28, 2021

(30) Foreign Application Priority Data

Jul. 31, 2018 (EP) .................................... 18186552
Jul. 12, 2019 (EP) .................................... 19185917

(51) Int. Cl.
*G04B 19/02* (2006.01)
*G04B 19/04* (2006.01)
(Continued)

(52) U.S. Cl.
CPC ............. *G04B 19/02* (2013.01); *G04B 9/005* (2013.01); *G04B 13/001* (2013.01);
(Continued)

(58) Field of Classification Search
CPC ...... G04B 19/048; G04B 13/02; G04B 19/02; G04B 13/008; G04B 13/001;
(Continued)

(56) References Cited

U.S. PATENT DOCUMENTS 4,671,670 A 6/1987 Kröner
7,136,327 B2 * 11/2006 Hopkins ............. G04B 19/042 434/304

(Continued)

FOREIGN PATENT DOCUMENTS

CN 201576169 U 9/2010
EP 0 211 285 A2 2/1987

(Continued)

OTHER PUBLICATIONS

International Search Report dated Nov. 5, 2019 in PCT/EP2019/069949 filed on Jul. 24, 2019, 2 pages.

*Primary Examiner* — Sean Kayes
(74) *Attorney, Agent, or Firm* — Oblon, McClelland, Maier & Neustadt, L.L.P.

(57) ABSTRACT

A variable timepiece display mechanism includes a resilient hand with two drive pipes integral with a one-piece flexible strip includes a tip or an index, with a driver for driving the pivoting of the pipe, and a stressor for stressing the strip so as to vary the position of the tip relative to the axis of the pipes, which includes an accelerator or decelerator device arranged such that it accelerates, or stabilizes the speed of, or slows down the first pipe and/or the second pipe over at least part of the angular travel thereof, which includes a device with a first differential gear on the drive gear train of the first pipe and/or a second differential gear on the drive gear train of the second pipe, and at least one cam forming an input of a differential gear.

21 Claims, 8 Drawing Sheets

(51) Int. Cl.

| | |
|---|---|
| ***G04B 13/00*** | (2006.01) |
| ***G04B 45/00*** | (2006.01) |
| ***G04B 9/00*** | (2006.01) |
| ***G04B 13/02*** | (2006.01) |
| ***G04B 19/08*** | (2006.01) |

(52) U.S. Cl.
CPC ......... *G04B 13/007* (2013.01); *G04B 13/008* (2013.01); *G04B 13/021* (2013.01); *G04B 19/042* (2013.01); *G04B 19/048* (2013.01); *G04B 19/082* (2013.01); *G04B 45/0061* (2013.01); *G04B 13/02* (2013.01)

(58) Field of Classification Search
CPC .. G04B 13/007; G04B 45/0061; G04B 9/005; G04B 13/021; G04B 19/082; G04B 19/042
See application file for complete search history.

(56) References Cited

U.S. PATENT DOCUMENTS

| | | | | |
|---|---|---|---|---|
| 2015/0109891 | A1* | 4/2015 | Stranczl | G04B 19/048 368/238 |
| 2017/0242400 | A1* | 8/2017 | Denden | G04B 45/0061 |

FOREIGN PATENT DOCUMENTS

| | | | |
|---|---|---|---|
| EP | 1 710 637 | A2 | 10/2006 |
| EP | 2 863 274 | A1 | 4/2015 |

* cited by examiner

VARIABLE-GEOMETRY TIMEPIECE DISPLAY MECHANISM WITH RESILIENT HAND

CROSS-REFERENCE TO RELATED APPLICATIONS

The present application is a national stage entry of International Application No. PCT/EP2019/069949, filed Jul. 24, 2019, which claims priority to European Patent Application No. 18186552.8, filed on Jul. 31, 2018, and European Patent Application No. 19185917.2, filed on Jul. 12, 2019, the entire content and disclosure of all of the above application is incorporated by reference herein.

FIELD OF THE INVENTION

The invention relates to a variable-geometry timepiece display mechanism, comprising at least one resilient hand, which comprises a first drive pipe integral with a first end of a flexible strip, and a second drive pipe integral with another end of said flexible strip, and which comprises a display index or tip which, in an unstressed free state of said resilient hand wherein both said first pipe and said second pipe are not subjected to any stress and are remote from one another, is remote from said first pipe and from said second pipe, the operating position of said resilient hand being a stressed position where said first pipe and said second pipe are coaxial to one another about an output axis, said display mechanism comprising first means for driving said first pipe about said output axis, and second means for driving said second pipe about said output axis, said first drive means and second drive means being arranged so as to deform said flexible strip, by varying the angular position of said second pipe relative to the angular position of said first pipe about said output axis, and so as to vary the radial position of said display index or tip relative to said output axis.

The invention further relates to a horological movement comprising at least one such display mechanism.

The invention further relates to a timepiece comprising at least one such horological movement, and/or comprising at least one such display mechanism.

The invention further relates to a scientific apparatus comprising at least one such horological movement, and/or at least one such display mechanism.

The invention relates to the field of analogue display mechanisms using moving mechanical components, for timepieces or scientific apparatuses.

BACKGROUND OF THE INVENTION

Patent documents EP2863274 and EP3159751 filed by MONTRES BREGUET SA disclose different arrangements of resilient hands, allowing a display on a timepiece to be adapted to the shape of the case or dial thereof, thanks to a radial extension obtained by controlling such a resilient hand which comprises flexible segments driven separately.

SUMMARY OF THE INVENTION

The invention proposes a reliable and extremely robust solution to the problem of providing an indicator having variable radial extension according to the position and control thereof.

For this purpose, the invention relates to a timepiece display mechanism comprising at least one such resilient hand, which comprises a first drive pipe integral with at least one flexible strip, according to claim 1.

The invention further relates to a horological movement comprising at least one such display mechanism.

The invention further relates to a timepiece comprising at least one such horological movement, and/or comprising at least one such display mechanism.

The invention further relates to a scientific apparatus comprising at least one such horological movement, and/or at least one such display mechanism.

BRIEF DESCRIPTION OF THE DRAWINGS

Other features and advantages of the invention will be better understood upon reading the following detailed description given with reference to the accompanying drawings, in which:

FIG. 17 shows the choice of a space rule for varying the radial length of the hand as a function of the angle of deviation between the two pipes thereof, this figure showing the output angle as a function of the input angle;

FIG. 18 shows the calculation of the primitive profiles of the toothings, according to the chosen centre-to-centre distance for the production thereof;

FIG. 19 shows the calculation of the driving toothing as a function of the defined number of teeth;

FIG. 20 shows the calculation of the driven toothing, which then allows the two wheels to be cut to the profile thus defined;

DETAILED DESCRIPTION OF THE PREFERRED EMBODIMENTS

Figure 1:
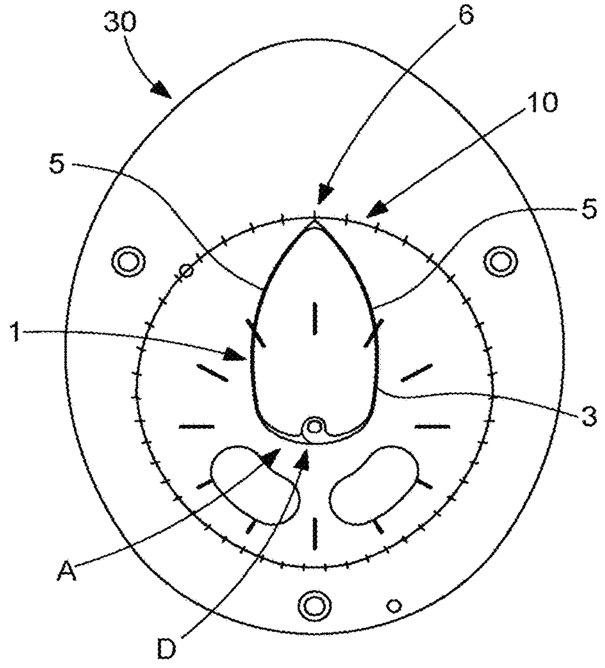
FIG. 1 shows a diagrammatic, plan view of a watch, in particular an oval-shaped women's watch, comprising a display mechanism according to the invention, comprising a resilient hand of variable length, the distal end whereof, which is formed by a tip between two flexible strips, is arranged such that it follows a non-circular trajectory; this resilient hand is shown in a twelve o'clock position, wherein the resilient hand is almond-shaped, and where the tip is in the furthest position thereof from an output axis.
Figure 2:
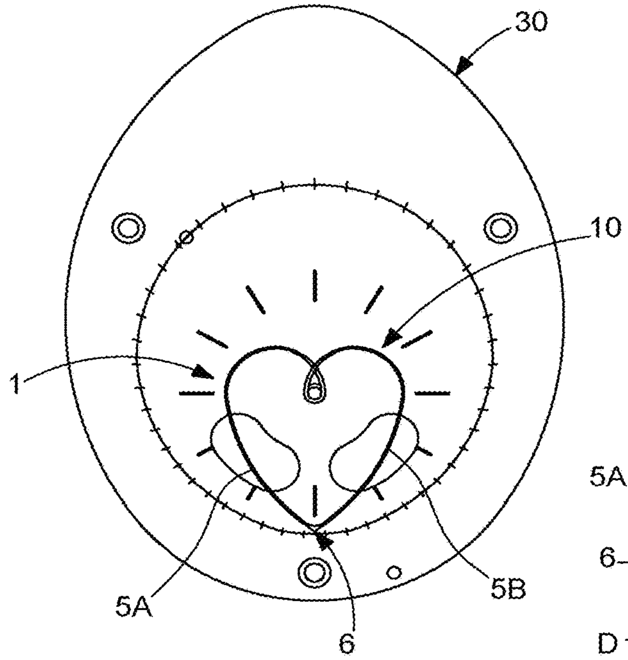
FIG. 2 shows, similarly to FIG. 1, the same watch, in a six o'clock position of the resilient hand, which is thus heart-shaped, and where the tip is in the closest position thereof to an output axis.

The invention relates to a display indicator for a timepiece or for a scientific apparatus.

Patent documents EP2863274 and EP3159751 filed by MONTRES BREGUET SA disclose a timepiece display using a resilient hand, and the features thereof can be directly used to produce a display mechanism according to the present invention.

The invention is described here in the particular, but non-limiting case of a rotating indicator, and particularly a resilient hand. However, the principle is applicable to an indicator having a non-circular trajectory of mobility, for example with a linear cursor, or suchlike, particularly in space. The invention is more precisely described for this application of a flexible indicator to a hand, but it is applicable to other planar or three-dimensional indicator shapes.

Similarly, drive means comprising gear trains are described hereinbelow, but the invention is equally applicable to analogue display means for an electronic or electrical apparatus, a quartz watch or other device.

The principle of the invention is to produce a display mechanism, wherein at least one indicator, particularly a hand, for example the minute hand for a watch, has a variable length, or a variable radial extension, or a variable shape.

The invention further relates to a variable-geometry timepiece display mechanism 10 that comprises at least one resilient hand 1. This resilient hand 1 comprises a first drive pipe 2 integral with at least one one-piece flexible strip 3, and with a single flexible strip 3 in the specific, non-limiting case shown in the figures.

The display mechanism 10 comprises an input wheel set 71, which is arranged so as to be driven such that it pivots about an input axis by a movement 20, and which defines an input angle relative to a reference direction.

The resilient hand 1 comprises a first drive pipe 2 integral with a first end of a flexible strip 3, and a second drive pipe 4 integral with another end of this flexible strip 3, and the resilient hand 1 comprises a display index or tip which, in an unstressed free state of this resilient hand 1 wherein both the first pipe 2 and the second pipe 4 are not subjected to any stress and are remote from one another, is remote from the first pipe 2 and from the second pipe 4. The operating position of this resilient hand 1 is a stressed position where the first pipe 2 and the second pipe 4 are coaxial to one another about an output axis D.

The display mechanism 10 comprises first means 11 for driving the first pipe 2 about the output axis D, and second means 13 for driving the second pipe 4 about this output axis D.

These first drive means 11 and second drive means 13 are arranged so as to deform the flexible strip 3, by varying the angular position of the second pipe 4 relative to the angular position of the first pipe 2 about the output axis D, and so as to vary the radial position of the display index or tip relative to the output axis D.

In one specific embodiment, the resilient hand 1, and more particularly the flexible strip 3 thereof, comprises a plurality of flexible segments 5, 5A, 5B that are joined end-to-end at at least one tip 6, arranged so as to form such an index, and preferably two successive flexible segments are joined by such a tip.

In the case shown in the figures, a first flexible segment 5A of the flexible strip 3 extends between the first pipe 2 and a first tip 6.

More particularly, the invention is shown in the most common case whereby the hand comprises two flexible segments 5 joined by a single tip 6, which is used for the display.

The display mechanism 10 comprises first means 11 for driving the first pipe 2 about an output axis D, and comprises second means 12 for stressing at least the first flexible segment 5: these second means 12 are arranged so as to vary the position of at least the first tip 6 relative to the output axis D. The first tip 6 is thus at a variable distance from the first pipe 2, as a function of the forces applied to the flexible strip 3 by the second stressing means 12.

FIGS. 1 to 5 show a specific case of such a mechanism, with a resilient hand 1 comprising a single tip 6, which follows, over an upper part of the travel thereof, a circle that is off-centred relative to the output axis, and over a lower part of the travel thereof, another circle centred about the output axis. It goes without saying that this is a specific case, and the mechanism 10, for the same oval-shaped watch, can also be dimensioned such that it follows the case contour or any other contour showcasing the product.

More particularly, the first drive means 11 and/or the second stressing means 12, and in particular the second drive means 13 comprised therein, comprise a first shaped gear train 111 and/or respectively a second shaped gear train 131, which is arranged or which are arranged so as to accelerate or stabilise the speed of, or slow at least the first pipe 2, and/or the second pipe 4, over a part of the angular travel thereof.

More particularly, the first drive means 11 and the second stressing means 12, and in particular the second drive means 13 comprised therein, comprise at least one first shaped gear train 111 and respectively at least one second shaped gear train 131, which are arranged so as to accelerate or stabilise the speed of, or slow the first pipe 2, and respectively the second pipe 4, over at least part of the angular travel of the first pipe 2, and respectively of the second pipe 4.

In one specific embodiment, shown in FIGS. 1 to 5, the first drive means 11 and the second stressing means 12 are arranged so as to drive the resilient hand 1 over the entirety of the angular travel thereof about the output axis D, and provide it, in projection on a display plane P or on a dial, and at different angular positions of the resilient hand 1, with at least one first shape in which the flexible segments 5: 5A, 5B, comprised in the flexible strip 3 do not cross paths outside of the first pipe 2, and at least one second shape in which the flexible segments 5: 5A, 5B, comprised in the flexible strip 3 cross paths outside of the first pipe 2. In the specific yet non-limiting case shown in the figures, this first shape is an almond shape, and this second shape is a heart shape. In another alternative embodiment, wherein the resilient hand 1 travels the surface area defined by an ellipse, this hand can successively take, over the revolution thereof, an alternation of first shapes and second shapes, for example an almond shape on each of the two ends of the major axis of the ellipse, and a heart shape on each of the two ends of the minor axis of the ellipse.

More particularly, and as disclosed in the patent documents EP2863274 and EP3159751, the resilient hand 1 comprises a second drive pipe 4 also integral with the flexible strip 3. The second stressing means 12 thus comprise second drive means 13 of the second pipe 4 in an assembled and stressed state of the resilient hand 1. In this assembled state of the resilient hand, both the first pipe 2 is, advantageously but not necessarily in a prestressed operating state, driven by the first drive means 11, and the second pipe 4 is, advantageously but not necessarily in a prestressed operating state, driven by the second drive means 13. Additionally, at least one of the tips 6 is, in a non-stressed free state of the resilient hand 1 in which both the first pipe 2 and the second pipe 4 are not subjected to any stress, remote from the first pipe 2 and from the second pipe 4, which first pipe 2 and second pipe 4 are spaced apart from one another in this free state of the resilient hand 1.

In the specific case shown in the figures wherein the flexible strip 3 only comprises one first flexible segment 5A and one second flexible segment 5B, only one such tip 6 joining them is present. Thus, more particularly, this first flexible segment 5A bears the first pipe 2 at a first end 52, and this second flexible segment 5B joined to the first flexible segment 5A bears the second pipe 4 at a second end 54. Moreover, in the free state of the resilient hand 1, the first end 52 and the second end 54 are remote from one another, or form a non-zero angle with one another from the tip 6 at which the first flexible segment 5A and the second flexible segment 5B are joined.

More particularly, the output of the second drive means 13 of the second pipe 4 is coaxial to the output of the first drive means 11 of the first pipe 2 in the assembled state of the resilient hand 1. However, this arrangement is not compulsory, in particular in the case of a retrograde display, where the axes of the first pipe 2 and of the second pipe 4 can be different.

According to the invention, the first drive means 11 and the second drive means 13 comprise an accelerator or decelerator device, which is arranged such that it accelerates, or stabilises the speed of, or slows down at least the first pipe 2 and/or said second pipe 4 over at least part of the angular travel thereof.

In one alternative embodiment, the first pipe 2 is advanced or delayed relative to the value of the input angle, which is symmetric to the delay or advance of the second pipe 4 relative to the input angle, such that the first tip 6 always displays, relative to the output axis D and the reference, an angle that is equal to the input angle.

In another alternative embodiment, the first pipe 2 is advanced or delayed relative to the value of the input angle, which is, as an absolute value, different to the delay or advance of the second pipe 4 relative to the input angle, such that the first tip 6 displays, relative to the output axis D and the reference, an angle that is variable relative to the input angle throughout the length of the travel thereof. This particular advance and/or delay arrangement relative to the input pipe allows the hand to point to the time (or another display) only on the dial, and in particular for a non-regular display, for example a square trajectory where the time is divided into twelve equally-spaced segments over the square trajectory, which cannot be managed in the same manner as twelve indexes separated by 30°.

In yet another alternative embodiment, the hand 1 is arranged such that it travels a total non-retrograde path and, over the total path, the average speed of the first pipe 2 is equal to the average speed of said second pipe 4.

Numerous configurations can be considered:

- if the arms of the hand are symmetric, a symmetric advance and delay are required, such that the hand points to the right time;
- if the arms of the hand are asymmetric, an advance and delay are required, such that the hand points to the right time;
- this works on the assumption that the hand points to the right time. A graduation can also be obtained, which graduation is not separated every 30° as explained hereinabove.

In one specific embodiment which will be described in detail hereinbelow, the accelerator or decelerator device comprises a first shaped gear train 111 and/or respectively a second shaped gear train 131.

Figure 29:
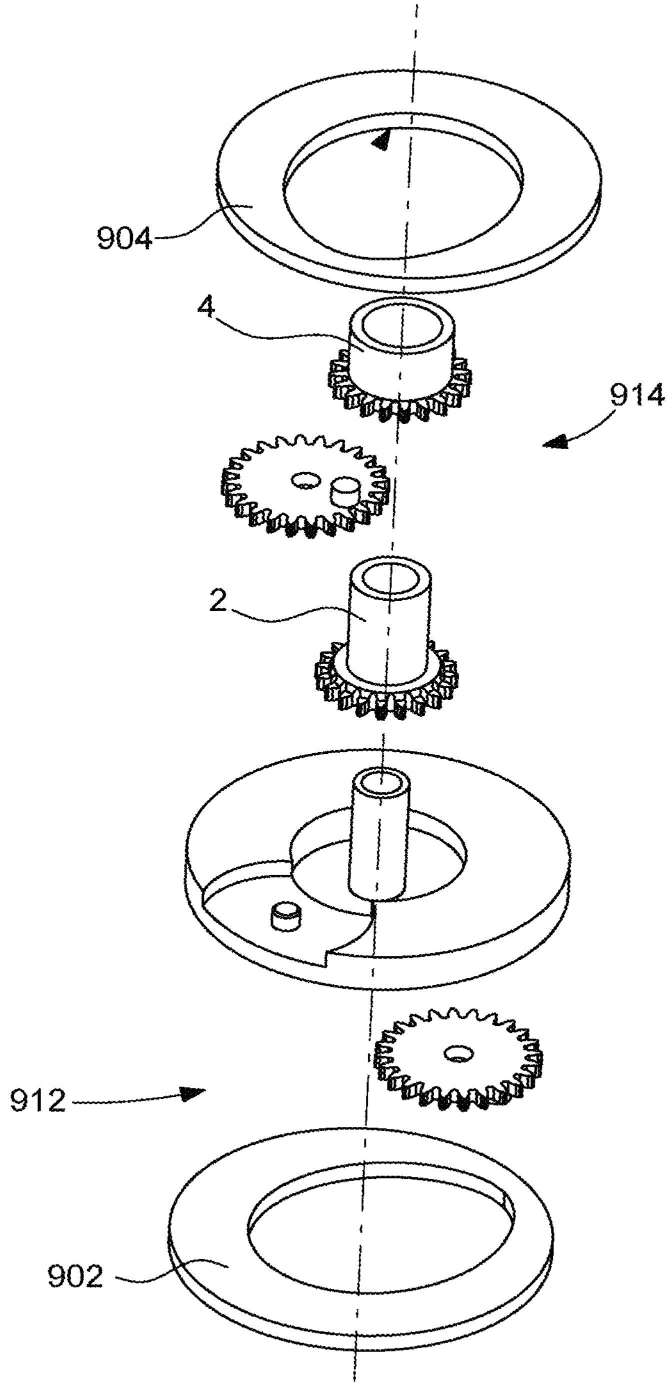
FIG. 29 shows an exploded perspective view of a display mechanism according to the invention, limited to the pipes of the resilient hand, which is not shown; this mechanism comprises two differential gears borne by a planet carrier frame that is capable of moving between two fixed flanges bearing differential gear input cams, and the assembly thus represented forms an additional unit capable of being adapted to an existing movement; the two pipes of the resilient hand are, in this case, coaxial about a cannon-pinion arranged so as to form an output of such a movement.

According to the invention, and as shown in FIG. 29, the accelerator or decelerator device comprises a device with a first differential gear 912 on the drive gear train of the first pipe 2 and/or a second differential gear 914 on the drive gear train of the second pipe, and at least one cam 902, 904 forming an input of such a differential gear 912, 914.

In yet another embodiment, the accelerator or decelerator device comprises single gear trains suitably arranged so as to perform the required accelerations or decelerations.

More particularly, and as shown in FIGS. 11 to 20, the first drive means 11 and the second drive means 13 comprise, respectively, at least one first shaped gear train 111 and at least one second shaped gear train 131, which are each arranged or which are arranged so as to accelerate, or stabilise the speed of, or slow the first pipe 2 and respectively the second pipe 4 over a part of the angular travel thereof. The term "shaped gear train" is understood herein to mean that at least one wheel of the gear train is not axisymmetric; more particularly, at least two counteracting wheels of this gear train are not axisymmetric, and are arranged so as to permanently gear with one another with minimal clearance and a constant centre-to-centre distance.

More particularly, the first shaped gear train 111 and the second shaped gear train 131 are arranged so as to accelerate or respectively brake the first pipe 2, and to brake or respectively accelerate the second pipe 4 over at least part of the angular travel of the resilient hand 1, or over only part of the angular travel of the resilient hand 1. In other words, one of the pipes procures an angular advance relative to the input angle, whereas the other pipe procures an angular delay relative to the input angle.

Thus, in one specific embodiment of the invention, the first pipe 2 is advanced or delayed relative to the value of said input angle, which is symmetric to the delay or advance of the second pipe 4 relative to the same input angle, such that the first tip 6 always displays, relative to the output axis D and the reference direction, an angle that is equal to the input angle.

Figure 3:
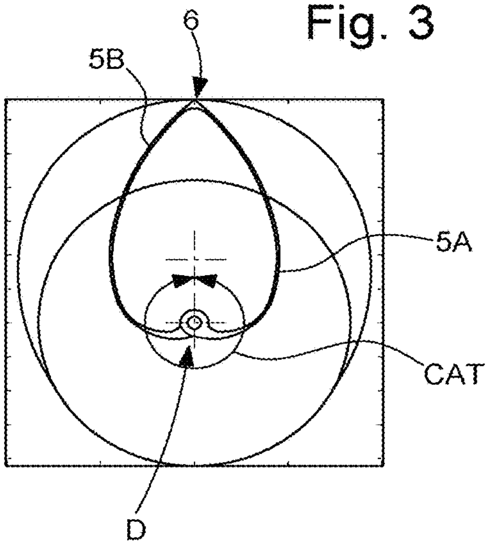
FIG. 3 shows, similarly to FIG. 1, the same watch, in the same position and having an almond-shaped resilient hand, this view showing a trajectory of the tip which, relative to the output axis, is lengthened about an angle of 120° from eight o'clock to twelve o'clock, and is shortened about another angle of 120° from twelve o'clock to four o'clock; the same trajectory is substantially circular relative to a circular off-centred axis, about an angle of about 240°, from the eight o'clock position to the twelve o'clock position, and from the twelve o'clock position to the four o'clock position.
Figure 4:
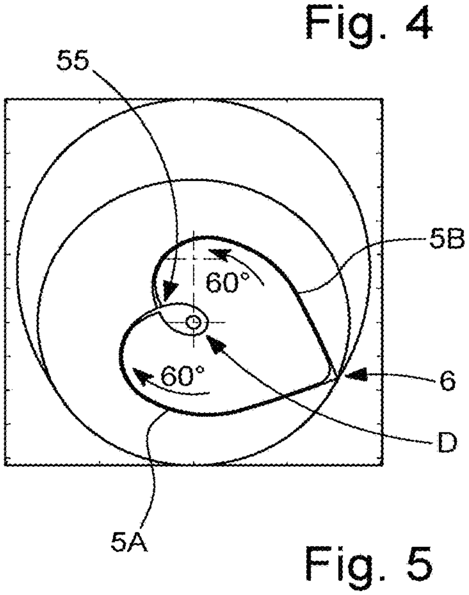
FIG. 4 shows, similarly to FIG. 2, the same watch, where the tip of the hand is in the four o'clock position, and where this resilient hand is now heart-shaped, after a change in shape occurring before this four o'clock position.
Figure 5:
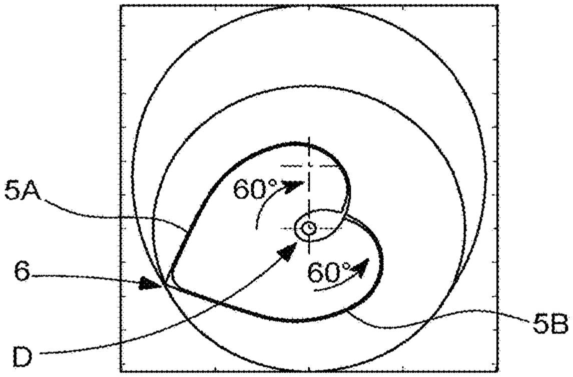
FIG. 5 shows, similarly to FIG. 4, the same watch, where the tip of the hand is in the eight o'clock position, and which is still heart-shaped. The tip has travelled, between the drawings in FIGS. 4 and 5, in a circle, in this case centred about the output axis, and is shown before any new change in shape after this eight o'clock position reproducing the almond shape shown in FIG. 3.
Figure 6:
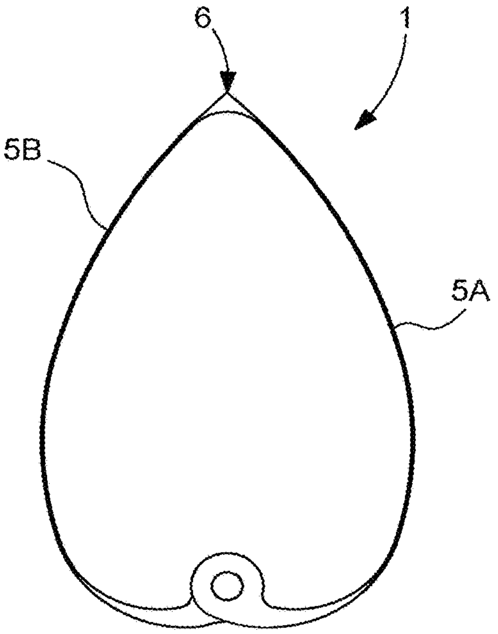
FIG. 6 shows a diagrammatic, plan view of the resilient hand in FIGS. 1 to 5, in a stressed operating position, wherein two end pipes comprised therein, at the ends of the two flexible strips thereof, are aligned with and superimposed on one another, each driven by a different wheel set.

Thus, considering the embodiment according to FIGS. 3 to 5, with a total angular travel CAT of 360°, from a position shown in FIG. 3 where the tip 6 of the hand 1 is in the twelve o'clock position, moving into the four o'clock position shown in FIG. 4, by rotation in the clockwise direction, the second pipe 4 of the second flexible segment 5B has slowed by 60°, and the first pipe 2 of the first flexible segment 5A has accelerated by 60°. More specifically, neither of the flexible segments 5 of the hand 1 indicates the time alone; it is only the resultant of the rotation of the two pipes that determines time information indicated by the tip 6 of the hand 1. Between the position in FIG. 4 and the eight o'clock position in FIG. 5, the pipes remain synchronous with the offset therebetween. In order to move from the eight o'clock position in FIG. 5 to the twelve o'clock position in FIG. 3, the opposite takes place: the second pipe 4 of the second flexible segment 5B has accelerated by 60°, and the first pipe 2 of the first flexible segment 5A has slowed by 60°.

The invention is shown in the figures for the specific case of a continuous horological display showing a full revolution; it is understood that the invention can be applied to any display, in particular a retrograde display.

More particularly, the first shaped gear train 111 and the second shaped gear train 131 are arranged such that they symmetrically control the first pipe 2 and the second pipe 4, such that the first flexible segment 5A and the second flexible segment 5B are symmetrical relative to a radial originating from the output axis D and passing by way of the tip 6 at which the first flexible segment 5A and the second flexible segment 5B are joined, over at least part of the angular travel of the resilient hand 1. This configuration is not limiting, however it has the advantage of subjecting the first flexible segment 5A and the second flexible segment 5B to symmetric stresses.

More particularly, the first shaped gear train 111 and the second shaped gear train 131 each comprise at least one pair of wheels arranged such that they engage by gearing with one another and whose geometric supports, i.e. the primitive curves, of the toothings are not axisymmetric.

Also more particularly, the first drive means 11 and/or the second drive means 13 comprise at least one first gear train stage 115, 135, and one second gear train stage 116, 136, which are arranged such that each controls a part of the shape transformation of the resilient hand 1 over at least part of the angular travel thereof, with distribution per stage. This distribution allows a part of the deformation to be distributed over each of the stages, which conserves, in each shaped gear train, wheels whose geometry is close to a circular geometry, so as to allow for suitable gearing of the toothings and prevent the wear thereof. More specifically, the shaped gear trains are not circular, however must not be excessively deformed, i.e. the shape thereof must allow for the gearing thereof without arcing, and without too high sensitivity to variations in the centre-to-centre distance and manufacturing tolerances. This can thus prevent interference defects that cut teeth would create if the primitive curves of the toothings deviated too far from the circular shape. A compromise must thus be found between a shape that is sufficiently non-circular so as to actuate the hand, and a shape that is resistant to wear. Distribution over a plurality of stages allows these conditions to be met: each stage takes part in the deformation of the hand, however the primitive curves thereof remain close to a circular shape; this is referred to as distribution per stage, whereby the overall cumulation of these staged gear trains procures the desired deformation of the hand.

The figures show a non-limiting alternative embodiment having two gear train stages, however this number of two is not limiting, and the number of stages is only limited by the overall thickness of the movement and the efficiency loss due to friction.

More particularly, both the first gear train stage 115, 135 and the second gear train stage 116, 136 respectively comprise a first shaped gear train 111 and a second shaped gear train 131.

FIGS. 11 to 20 show certain specific arrangements of such shaped gear trains.

Figure 11:
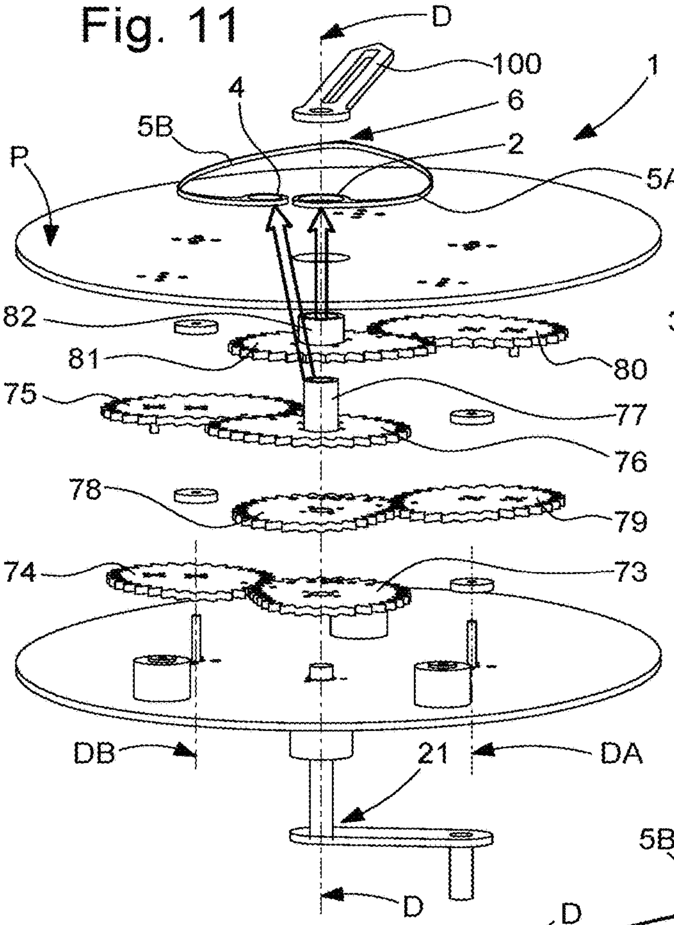
FIG. 11 is a schematic diagram of an exploded view of a display mechanism, where a power take-off, in the bottom part of the figure, is arranged to drive two gear trains, the first for driving the first pipe, and the second for driving the second pipe; the arrows show the transmission of the movement; the gear trains comprise shaped trains, which are arranged such that they accelerate, stabilise or slow the rotation of one of the pipes relative to the other; the resilient hand is shown in an entirely free state, without any divisible element; this view also shows a conventional hand, coaxial to the resilient hand, for displaying other information, in particular time information.

FIG. 11 is a schematic representation of the functioning of such a mechanism 10, wherein the arrows symbolise the transmission of the movement to the pipes from a power take-off 21 at the level of a horological movement 20, which can be either mechanical or electronic, symbolised in the bottom part of the figure, and which is arranged so as to drive, via the same input wheel set 71, two gear trains: —a first gear train comprises idler wheels 79 and 80 about a first axis DA and wheels 73, 78 and 81 about the major pivot axis D for driving the first pipe 2, —and a second gear train comprises idler wheels 74, 75 about a second axis DB and a wheel 76 about the major pivot axis D for driving the second pipe 4.

It should be noted that the entire gear train is tensioned as a result of the play compensation of the resilient hand due to the prestressing thereof.

FIG. 11 also shows a conventional hand 101 coaxial to the resilient hand 1 for displaying other information, in particular time information.

Figure 12:
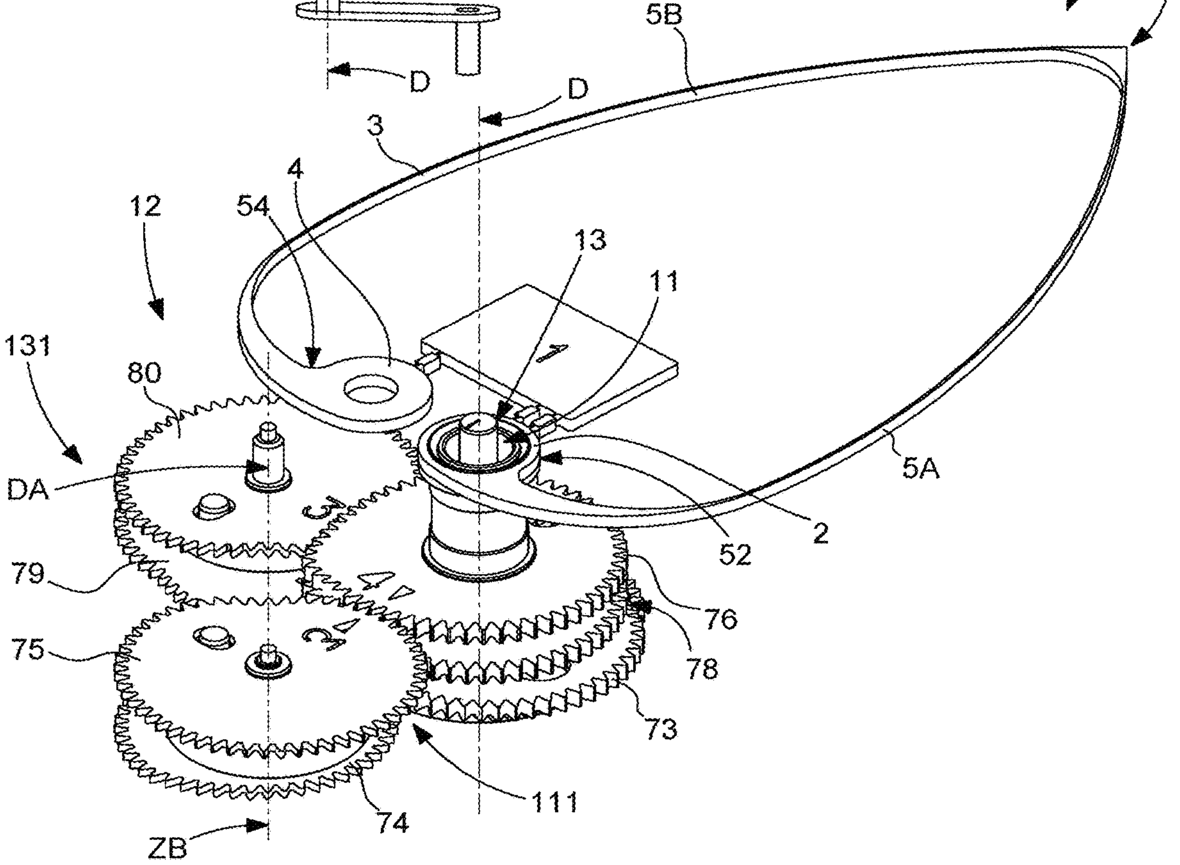
FIG. 12 is a perspective view of a display mechanism according to an alternative embodiment, wherein an input wheel set, arranged such that it engages with an output wheel set of the horological movement, is coaxial to a drive shaft, and to a cannon-pinion on which the first pipe is shown in the assembled state, the second pipe being shown in the free state of the resilient hand before the positioning thereof coaxial to the first pipe on the drive shaft; each shaped wheel comprises an angular marking so as to correctly procure the shaped gear train effect.
Figure 13:
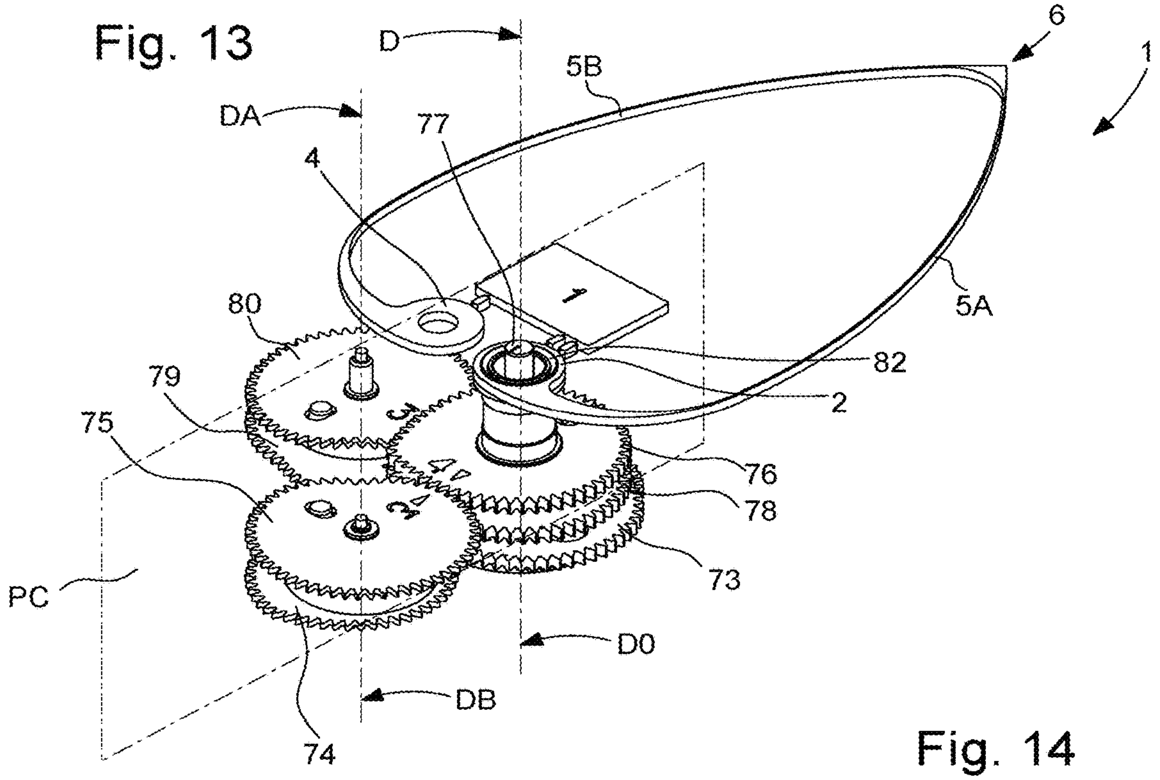
FIG. 13, which is similar to FIG. 12, shows the positioning of a cutting plane according to which the sectional drawing of FIG. 14 is produced.
Figure 14:
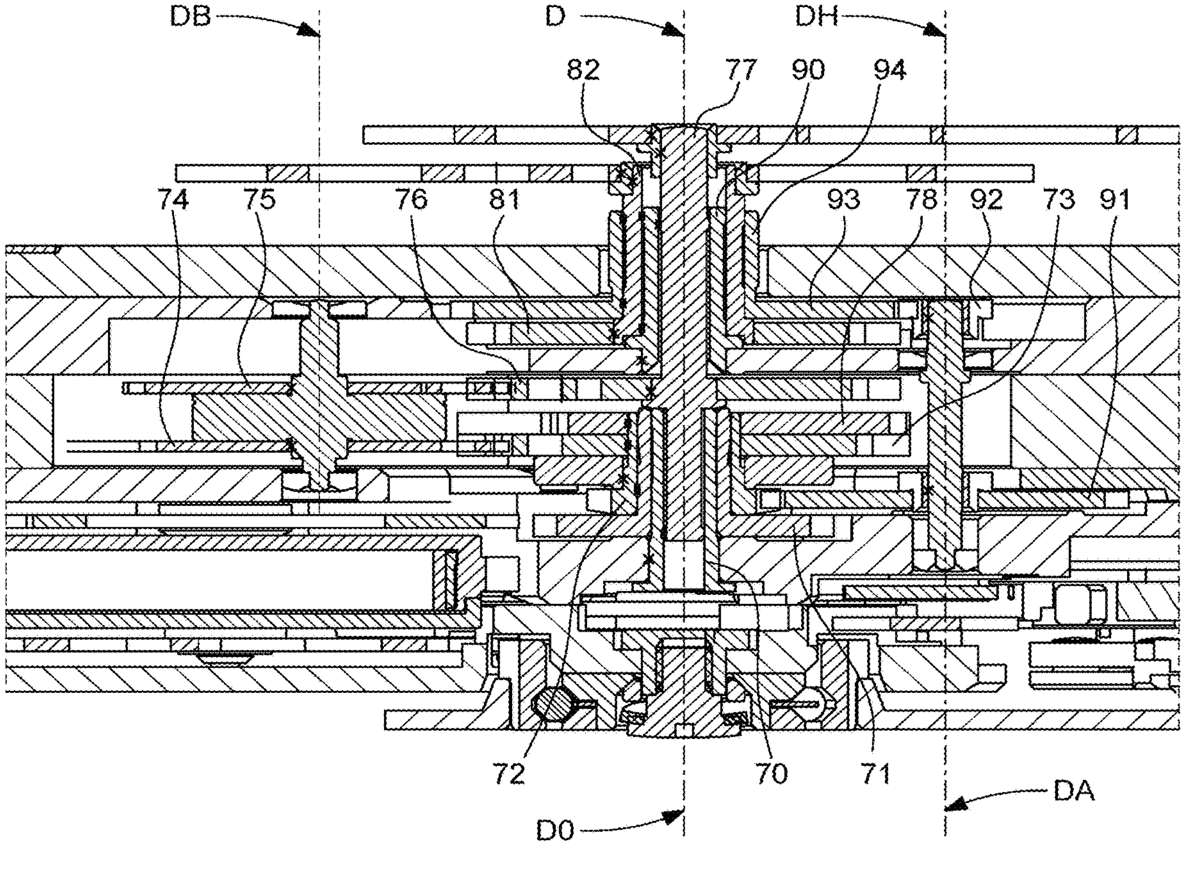
FIG. 14 is a partial sectional view, according to the plane shown in FIG. 13, of a horological movement driving a mechanism according to the invention.

FIGS. 12 to 14 show more specifically a display mechanism 10 according to an alternative embodiment of the invention for displaying minutes with the resilient hand 1. In this alternative embodiment, an input wheel set 71 is arranged so as to engage with an output wheel set 21 of the horological movement 20, according to an input axis D0, and is guided on a fixed tube 70. This input wheel set 71, which is a cannon-pinion, is arranged so as to drive, directly or via indenting, by friction allowing the time to be set, a driving cannon-pinion 72 which is coaxial thereto.

This driving cannon-pinion 72 is axisymmetric, and drives a first shaped wheel 78, which gears with a second complementary shaped wheel 79 mounted such that it idles (with play compensation) about the first axis DA, and which is pivotably integral with a third shaped wheel 80, which gears with a fourth complementary shaped idler wheel 81, which in this case pivots about the output axis D of the pipes, and which comprises a cannon-pinion 82 for attaching the first pipe 2.

The same driving cannon-pinion 72 drives a fifth shaped wheel 73, which gears with a sixth complementary shaped wheel 74 mounted such that it idles about the second axis DB, and which is pivotably integral with a seventh shaped wheel 75, which gears with an eighth complementary shaped idler wheel 76, which in this case pivots about the output axis D of the pipes, and is integral with a shaft 77 on which the second pipe 4 is attached.

Figure 26:
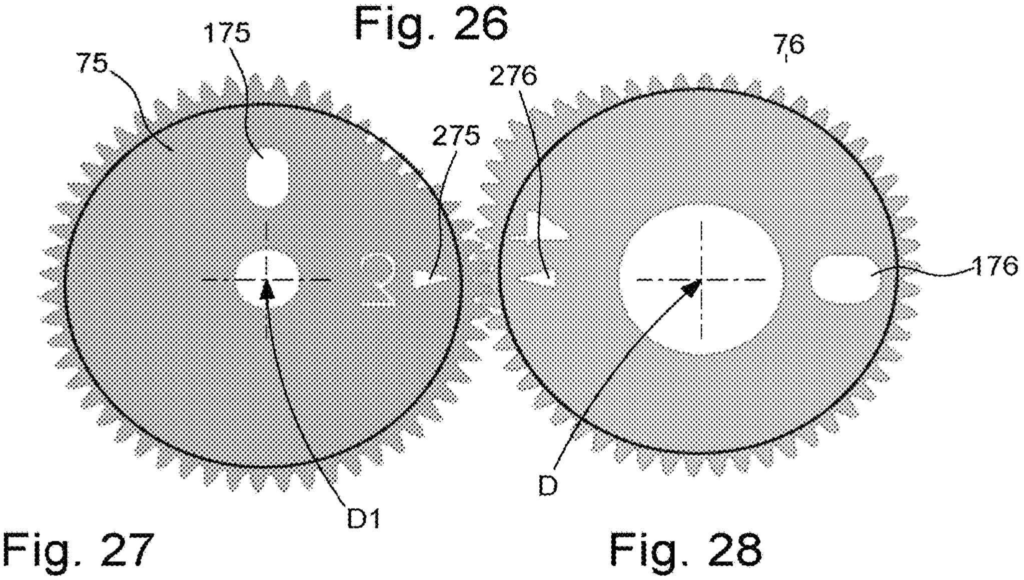
FIG. 26 shows a plan view of a shaped gear train comprising two non-axisymmetric wheels, and comprising markings for the indexing thereof relative to one another.

Each shaped wheel comprises an angular marking so as to correctly ensure indexing of the shaped gear train, as shown in FIG. 26 which illustrates a shaped gear train comprising two non-axisymmetric wheels 75 and 76, and comprising markings 275 and 276 for the indexing thereof relative to one another, in addition to oblongs 175 and 176 easing the installation thereof, which in particular allows them to be made integral with one another and indexed by means of a pin or similar element.

The driving cannon-pinion 72 further drives a ninth wheel 91 comprised in a wheel set pivoting about an hour axis DH, which comprises a pinion 92 driving the wheel 93 of an hour cannon-pinion 94 receiving the hour hand 100.

Figure 16:
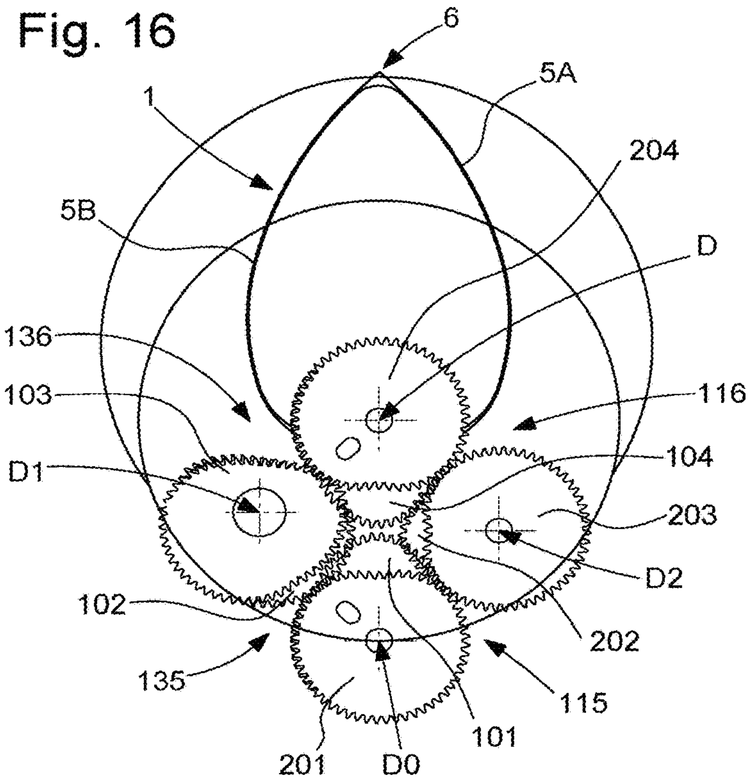
FIG. 16 is a plan view of a display mechanism according to an alternative embodiment, wherein an input wheel set, arranged such that it engages with an output wheel set of the horological movement, is separate from the output axis, and where each gear train comprises two stages so as to distribute the angular travel of each stage, and where each stage comprises a shaped gear train.
Figure 15:
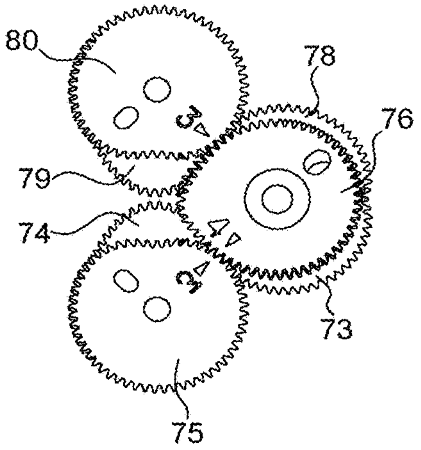
FIG. 15 shows a plan view of a two-stage gear train so as to distribute the angular travel of each stage, and where each stage comprises a shaped gear train.

FIGS. 15 and 16 show an alternative embodiment, wherein an input wheel set, arranged such that it engages with an output wheel set of the horological movement, pivots about an input axis D0 which in this case is separate from the output axis D, and where each gear train comprises two stages so as to distribute the angular travel of each stage, and where each stage comprises a shaped gear train:

- a first gear train comprises a first stage with a first shaped wheel 101 pivoting about the input axis D0, which gears with a second complementary shaped wheel 102, mounted such that it idles about a first minor axis D1. This second complementary shaped wheel 102 is pivotably integral with a third shaped wheel 103, which gears with a fourth complementary shaped wheel 104, mounted such that it pivots about the output axis D, and designed for attaching one of the two pipes;
- a second gear train, illustrated separately in FIG. 16, comprises a first stage with a first shaped wheel 201 pivoting about the input axis D0, which gears with a second complementary shaped wheel 202, mounted such that it idles about a second minor axis D2. This second complementary shaped wheel 202 is pivotably integral with a third shaped wheel 203, which gears with a fourth complementary shaped wheel 204, mounted such that it pivots about the output axis D, and designed for attaching the other pipe.

The case of a construction with radial symmetry of movement between the two flexible segments of the same hand 1 uses two similar sets of identical shaped gear trains, one mounted the right way up, the other upside down.

Figure 17:
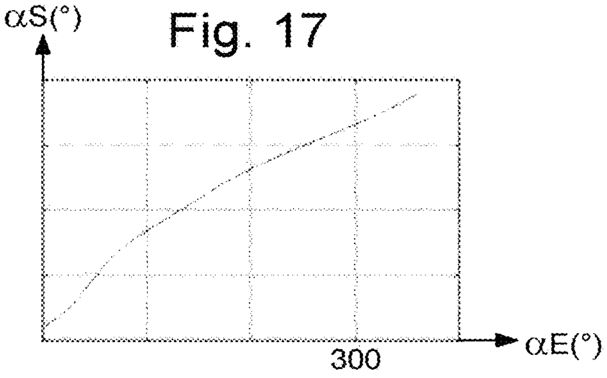
FIGS. 17 to 20 show the construction of the shaped gear trains.
Figure 18:
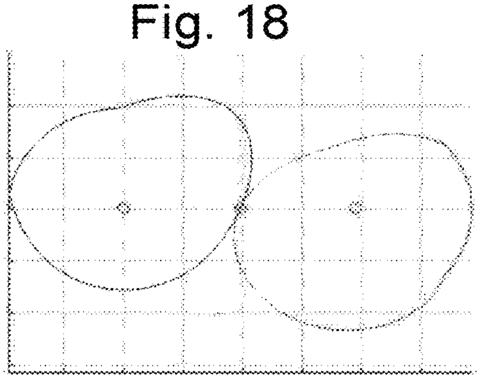
Figure 19:
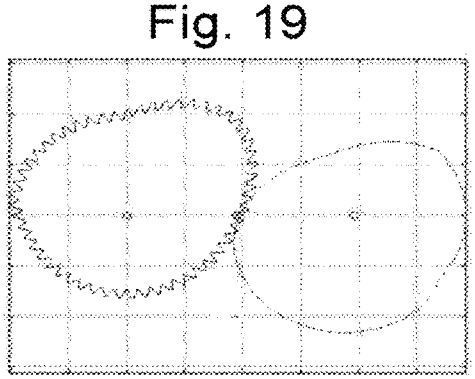
Figure 20:
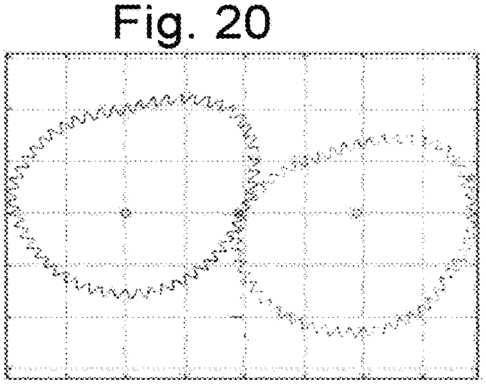
Figure 21:
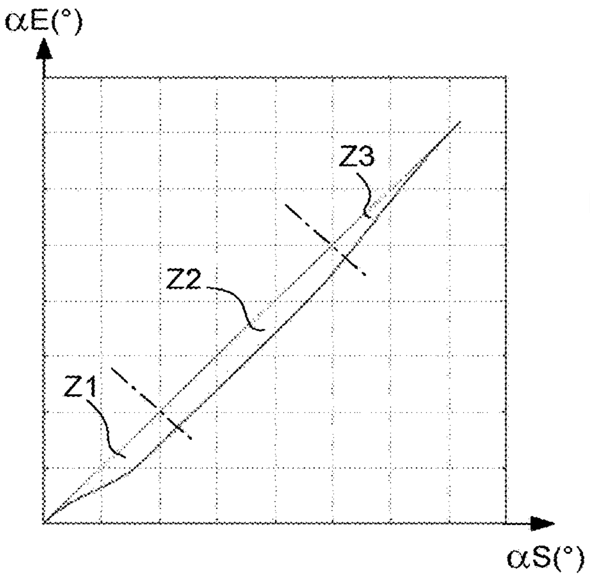
FIG. 21, which is similar to FIG. 17 but inverted, shows three successive areas of radial extension of the hand, of stabilisation of the length of the hand, and of shortening of the hand.

FIGS. 17 to 20 show the construction of the shaped gear trains, which begins with the choice of a space rule for varying the radial length of the hand as a function of the angle of deviation between the two pipes thereof, FIG. 17 showing the output angle as a function of the input angle for one of the two pipes of the hand. This space rule allows the primitive profiles of the toothings to be calculated, according to the chosen centre-to-centre distance for the production thereof, as shown in FIG. 18. The calculation of the driving toothing is then carried out as a function of the defined number of teeth, and the chosen profile type, in particular involute- or sinusoidal-type toothing, according to FIG. 19, then the calculation of the driven toothing, according to FIG. 20, allows the two wheels to be cut to the profile thus defined;

FIGS. 17 and 20 show the space rule, with three successive areas of radial extension of the hand, of stabilisation of the length of the hand where the ratio between the output angle of one of the two pipes and the input angle in the mechanism is substantially constant, and of shortening of the hand.

Figure 22:
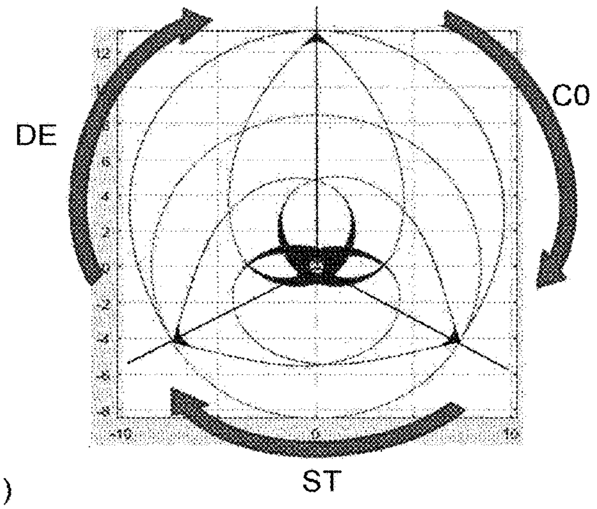
FIG. 22 is a plan view of the superimposition of the three states shown in FIGS. 3 to 5, and the arrows highlight a contraction phase CO of the hand between the twelve o'clock and four o'clock positions of the tip thereof, a stability phase ST at constant elongation between the four o'clock and eight o'clock positions, and a relaxation phase DE between the eight o'clock and twelve o'clock positions.

FIG. 22 shows the superimposition of the three states shown in FIGS. 3 to 5, wherein the arrows illustrate a contraction phase CO of the hand 1 between the twelve o'clock and four o'clock positions of the tip 6 thereof, a stability phase ST at constant elongation between the four o'clock and eight o'clock positions, and a relaxation phase DE between the eight o'clock and twelve o'clock positions. This distribution is made possible by the use of shaped gear trains, and in particular of mechanisms with multiple shaped gear train stages, which allow sufficient angular displacements to be imposed on the pipes, in order to allow for significant changes in shape, and in particular to allow the flexible segments to cross paths as they do in the shape of a heart. These shaped gear trains allow one pipe to be safely slowed down relative to the other.

Figure 27:
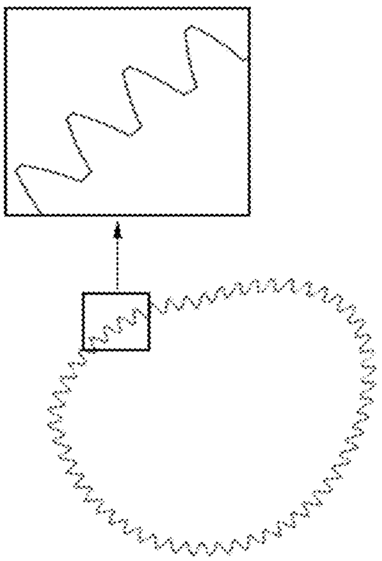
FIG. 27 shows one such wheel with an involute toothing, which has been magnified.
Figure 28:
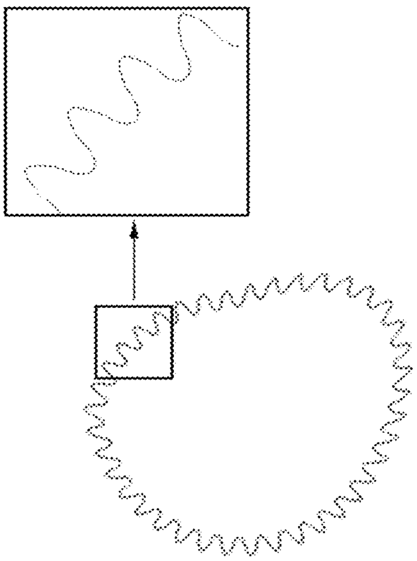
FIG. 28 shows one such wheel with a sinusoidal toothing, which has been magnified.

The wheel in FIG. 27 is one example of the optimisation of the case in FIG. 22; in order to correct the trajectories about angles of 140°-80°-140° as shown, instead of 120°-120°-120° which would be more balanced, wheels must be designed, without any specific distribution per stage, i.e. if the top stage and the bottom stage each carry out half of the angular transformation, said wheels having very high deformations, and very inclined teeth, which are fragile and difficult to machine. Another distribution, for example 20% of the deformation at the bottom stage and 80% at the top stage allows wheels that are closer to a round shape to be obtained, which are easier to machine, and with near-standard teeth, thus with improved kinematic and tribological parameters, and less wear.

Figure 23:
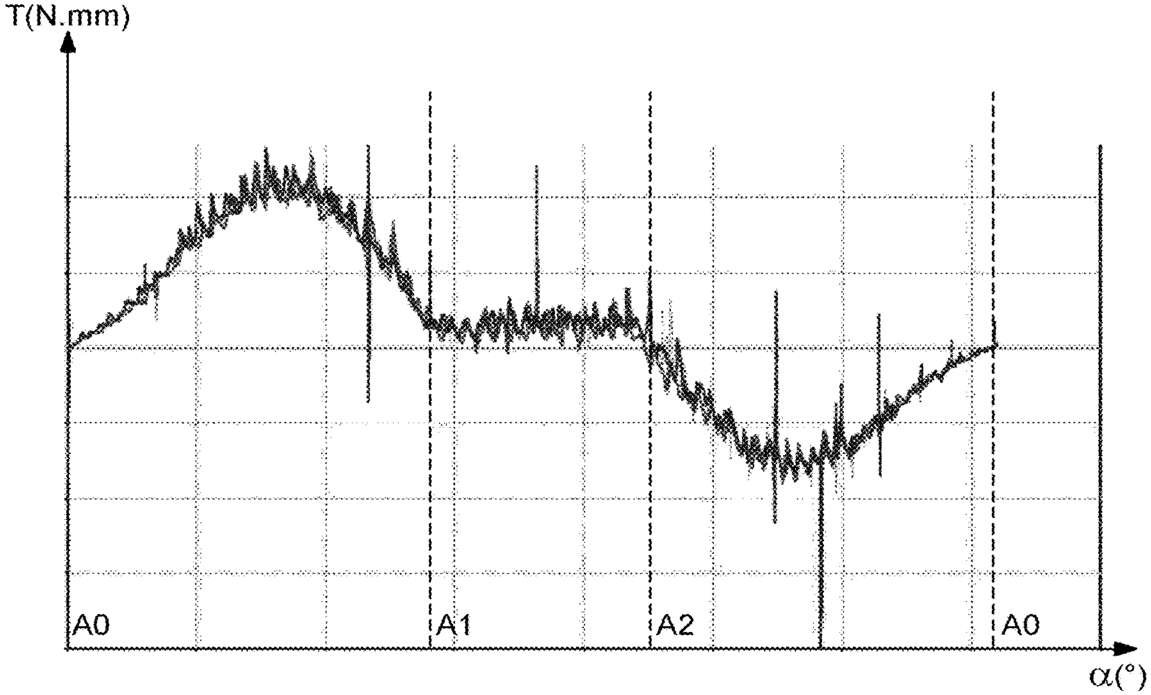
FIG. 23 is a diagram showing, along the ordinate, the change in torque between the flexible segments of the resilient hand as a function of the angle travelled, with a first area wherein the length of the resilient hand is reduced with torque consumption, a second phase of maintaining the length of the hand at a substantially constant torque, and a third phase of extending the hand with torque restitution.
Figure 24:
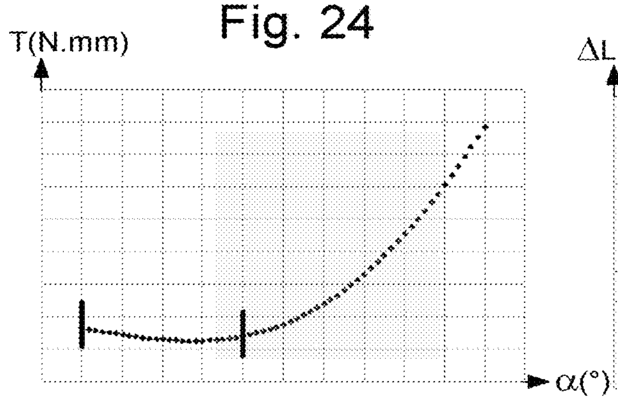
FIG. 24 is a diagram showing, along the ordinate, the change in torque on a pipe as a function of the angle of rotation of a pipe.
Figure 25:
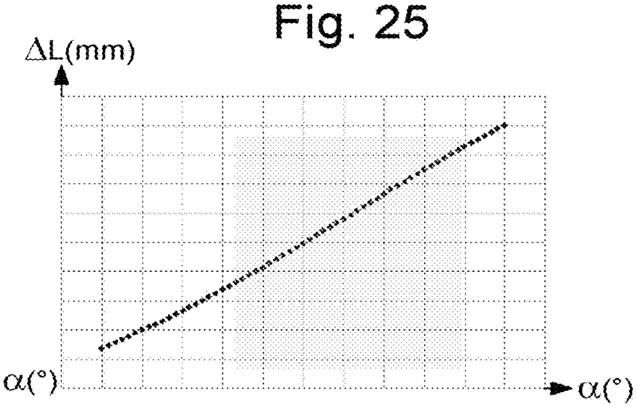
FIG. 25 is a diagram showing, along the ordinate, the radial extension of the hand as a function of the angle of rotation of a pipe.

FIG. 23 shows the change in torque between the flexible segments of the resilient hand as a function of the angle travelled, with a first area wherein the length of the resilient hand is reduced with torque consumption, a second phase of maintaining the length of the hand at a substantially constant torque, and a third phase of extending the hand with torque restitution, FIG. 24 shows the change in torque on a pipe as a function of the angle of rotation of a pipe, and FIG. 25 shows the radial extension of the hand as a function of the angle of rotation of a pipe.

The resilient hand 1 can be produced in a variety of different ways.

In an alternative embodiment, in the free state, the resilient hand 1 extends over a single planar level comprising the first pipe 2 and the second pipe 4, and the resilient hand 1 is thus arranged such that it is mounted in a twisted manner in a stressed operating position wherein the first pipe 2 and the second pipe 4 are superimposed on one another.

In an alternative embodiment, in the free state, the resilient hand 1 extends over a first planar level comprising the first pipe 2 and over a second planar level comprising the second pipe 4, and comprises a connecting area between the first planar level and the second planar level at a tip 6 between a first flexible segment 5A bearing the first pipe 2 and a second flexible segment 5B joined to the first flexible segment 5A and bearing the second pipe 4, and the resilient hand 1 is arranged such that it is mounted in a non-twisted manner in a stressed operating position wherein the first pipe 2 and the second pipe 4 are superimposed on one another. In another specific alternative embodiment, when the resilient hand 1 comprises more than two flexible segments 5, in the free state, the resilient hand 1 extends over, at most, as many parallel levels as there are flexible segments 5, and is arranged such that it is mounted in a non-twisted manner in a stressed operating position wherein the first pipe 2 and the second pipe 4 are superimposed on one another.

Figure 10:
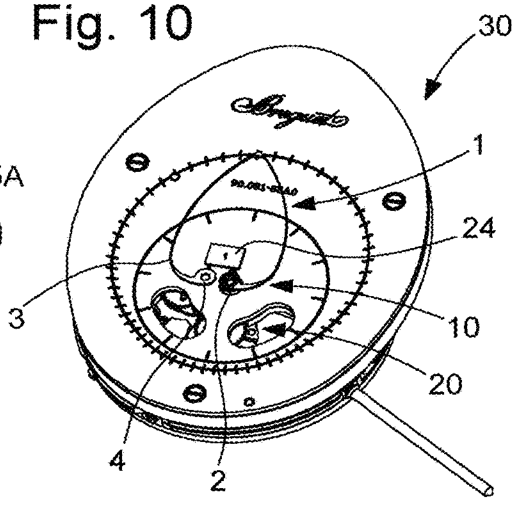
FIG. 10 shows, similarly to FIG. 1, the same watch, in the same position and where the resilient hand comprises a divisible element connecting the two end pipes thereof and easing the assembly thereof on the horological movement, in addition to handling of the second pipe for the placement thereof above the first, before the breaking of the fragile bonds connecting the divisible elements to the two pipes by the horologist.

In a specific alternative embodiment intended to facilitate assembly, as shown in FIG. 10, in the free state, the resilient hand 1 comprises a divisible element 24 joining the first pipe 2 and the second pipe 4, in order to facilitate the assembly of the resilient hand 1 on a drive wheel set of the first pipe 2 or of the second pipe 4, this divisible element 24 being arranged such that it can be broken and allow for the passage of the resilient hand 1 into a stressed operating position wherein the first pipe 2 and the second pipe 4 are superimposed on one another.

Figure 7:
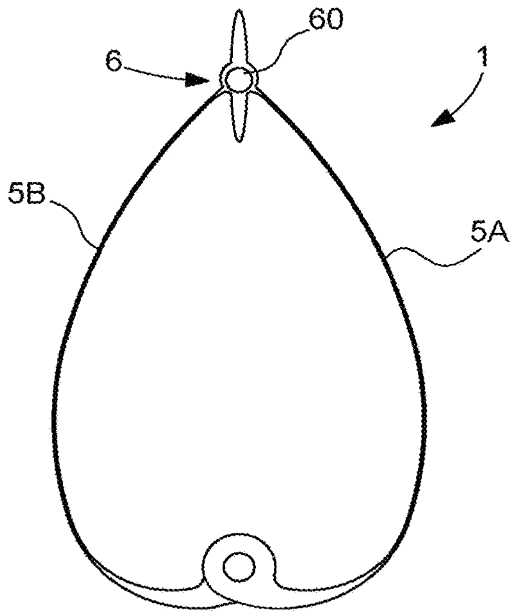
FIG. 7 shows an alternative embodiment to that in FIG. 6, wherein the tip comprises an eye arranged for allowing specific viewing of a dial.
Figure 8:
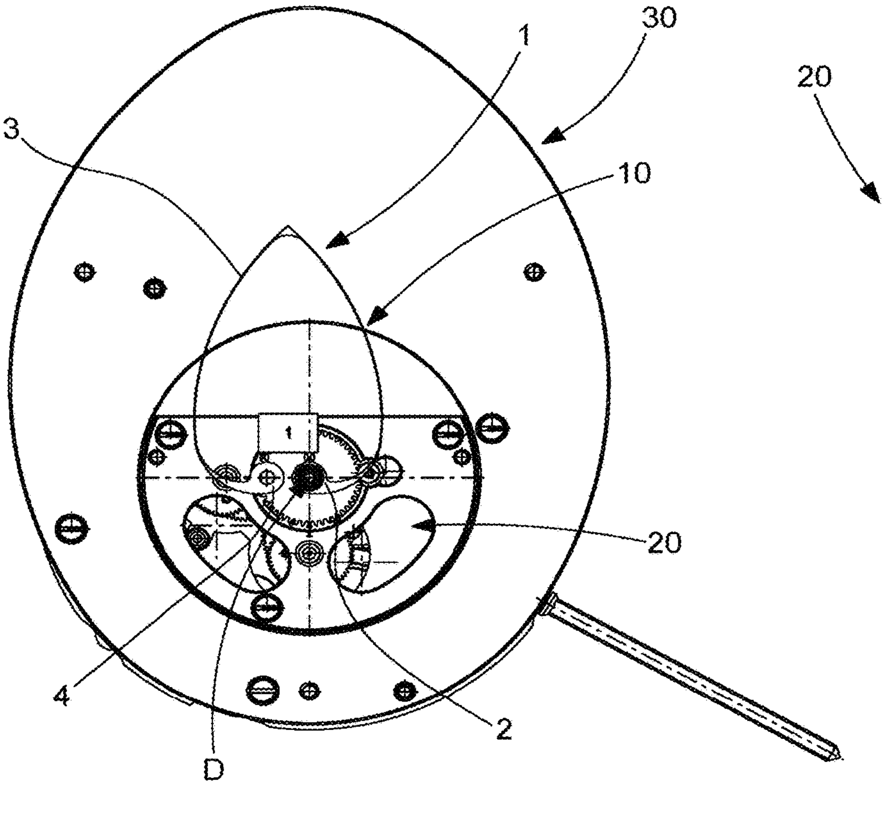
FIG. 8 shows, similarly to FIG. 1, the same watch, in the same position and with a denuded, almond-shaped form of the resilient hand, which is free, in a non-stressed state, and fixed to a drive wheel set by only one of the pipes thereof.
Figure 9:
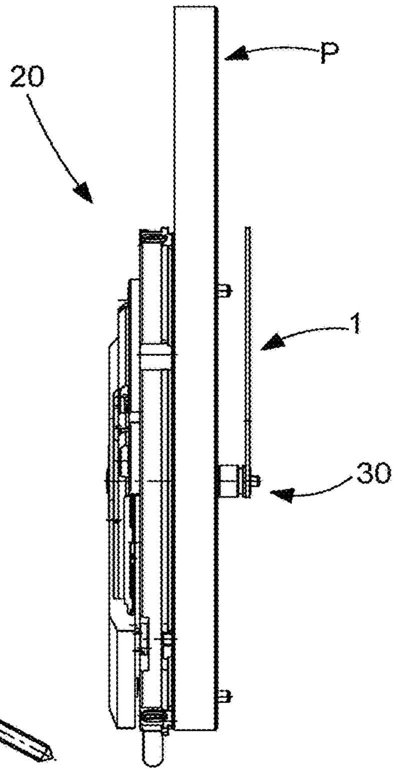
FIG. 9 shows a left-hand view of the watch in FIG. 8.

FIG. 7 shows one specific alternative embodiment wherein the resilient hand 1 comprises at least one eye 60, which is arranged such that it forms an aperture for reading information appearing on a dial 61 comprised in the mechanism 10, and in front of which the resilient hand 1 extends, or comprised in a horological movement 20, on which the mechanism 10 is arranged for attachment thereto. For example, this eye allows a town or city to be viewed in a GMT application, or the a.m. time from 0 to 12 to be differentiated from the p.m. time from 13 to 24, in a specific application wherein the display mechanism is driven over two revolutions, the first with a certain extension of the resilient hand 1 in order to display the a.m. time, and the second with a different extension in order to display the p.m. time; it goes without saying that this alternative embodiment can also be compatible with a display by the tip 6 of the hand 1, the presence of such an eye 60 improving reading comfort for the user. FIG. 7 also shows two inner and outer indexes on either side of this eye 60, which also allow for specific readings, depending on the adopted dial configuration. One of the main advantages of the invention is that it allows for high design freedom as regards the dial, and for the placement of certain display areas outside of areas that are unavailable, for example as a result of the presence of a tourbillon or other complication.

Advantageously, the hand 1 is made from a material that can be micro-machined according to a "LIGA" method, and is in particular made of nickel-phosphorus $NiP_{12}$ or similar material. Such a hand can be gold-plated, or can receive any other colouring, the adherence whereof is satisfactory on such a material. The hand 1 can be coloured using different methods: PVD, CVD, ALD, electrodepositing, painting, lacquering, or other coating or ionisation.

The hand 1 can comprise jewel setting or similar, and/or decoration by engine-turning, engraving, angling or enamelling, the latter being reserved to areas of low deformation such as the circumference of the pipes, an eye circumference, the tip or similar areas.

More particularly, the mechanism 10 forms an additional module, which is arranged so as to be connected to a horological movement 20, and the first drive means 11 and the second stressing means 12 comprise a common input 71, which is arranged so as to be driven by a single output 21 comprised in the movement 20, such as the cannon-pinion that rotates in one hour, or the minutes wheel set.

In an alternative embodiment, in addition to or in place of the shaped gear trains, the mechanism 10 comprises, between on the one hand the input wheel set 71 arranged so as to be driven by the movement 20, and on the other hand the first pipe 2 and/or the second pipe 4, at at least one stage, a cam 902, 904. This cam is arranged such that it controls a differential gear 912, 914, a first input whereof is formed by the input wheel set 71, a second input whereof is a wheel set, in particular a rack, controlled by this cam 902, 904, and the output whereof gears with the gear train for transmitting the movement to the first pipe 2 or respectively to the second pipe 4.

In a first application of this alternative embodiment, the mechanism 10 comprises, between the input wheel set 71 and the first pipe 2, at the level of at least one stage, a single cam 902 arranged such that it controls a first differential gear 912, a first input whereof is formed by the input wheel set 71, a second input whereof is a first wheel set or a first rack controlled by the cam 902, and the output whereof gears with the gear train for transmitting the movement to the first pipe 2, and between the input wheel set 71 and the second pipe 4, the same single cam 902 arranged such that it controls a second differential gear 914, a first input whereof is formed by the input wheel set 71, a second input whereof is a second wheel set or a second rack controlled by the cam 902, and the output whereof gears with the gear train for transmitting the movement to the second pipe 4.

In a second application of this alternative embodiment, the mechanism 10 comprises, between the input wheel set 71 and the first pipe 2, at the level of at least one stage, a first cam 902 arranged such that it controls a first differential gear 912, a first input whereof is formed by the input wheel set 71, a second input whereof is a first wheel set or first rack controlled by the first cam 902, and the output whereof gears with the gear train for transmitting the movement to the first pipe 2; and, between the input wheel set 71 and the second pipe 4, a second cam 904 driven by the input wheel set and arranged such that it controls a second differential gear 914, a first input whereof is formed by the input wheel set 71, a second input whereof is a second wheel set or a second rack controlled by the second cam 904, and the output whereof gears with the gear train for transmitting the movement to the second pipe 4.

The use of a cam allows for highly non-circular trajectories, additionally with jumps of the hand. The use of a single cam for both differential gears allows a simultaneous jump of the two pipes to be performed, for example at midnight; the first differential gear adds the information of the cam for the first pipe, and the second differential gear subtracts the information for the second pipe.

In another specific alternative embodiment, at least one wheel comprised in the gear train mechanism arranged between, on the one hand, the input wheel set 71 arranged such that it is driven by a movement 20 and, on the other hand, the first pipe 2 and/or the second pipe 4, at the level of at least one stage, comprises an incomplete toothing, each missing tooth allowing the resilient hand 1 to relax, by rotation of only one of the pipes 2, 4, during the passage of the space corresponding to a missing tooth, or to the missing teeth, so as to control a recoil of the tip 6 of the resilient hand 1.

In particular, a gear train can be used, comprising one or more, or even all circular wheels, at least one circular wheel whereof is devoid of one or more teeth in order to allow the hand to relax, and to perform a jump at the end of the so-called spiral display travel carried out by the tip 6 of the hand 1. If, for example, the first pipe rotates faster than the second pipe, and if the driving cannon-pinion 72 is locally devoid of teeth, the hand tends to contract, for example over two revolutions and, when the missing teeth release the first pipe, the hand becomes taught but the second pipe does not move, and the tip of the hand recoils. The advantage of such an alternative embodiment is to allow for the conventional machining of the wheels.

FIG. 24 shows the very low level of torque consumed for the deformation of such a LIGA hand 1, during the shortening thereof, which only has a very slight influence on the running of the movement. As a result of the proximity of the escapement, it nonetheless remains advantageous to reduce this perturbation as much as possible, which can be obtained using very thin flexible segments 5, typically less than 100 micrometres in width and 200 micrometres in height for a LIGA construction. It is understood in FIG. 24, which shows that the torque curve as a function of the angle is U-shaped with a very flat bottom, that it is advantageous, during design, to choose an angular deformation range corresponding to the lowest level of the torque curve so as to minimise the induced spurious torque and thus minimise the perturbation to watch operation. A staged design with a specific distribution helps to select optimal angular ranges. The correct choice of this angular range also allows the thickness of the segments 5 of the hand 1 to be increased in order to make it more visible, without significantly increasing the perturbation torque thereof.

By way of comparison, the induced perturbation to operation is less than that caused by a change in date at midnight for a date mechanism.

The invention is shown in the figures with a simple shape, however it can be declined with very different hand shapes. For example, an asymmetrical hand composed of two V shapes interlocking with one another and having the same direction, each arm of each V shape being integral with one of the pipes, and the extremal end of the other arm being linked to the similar end of the other V shape. Alternatively, it can be a two-armed hand with two segments joining a first tip and attached to the two pipes, and two other segments joining a second tip remote from the first, and attached to the same pipes. Alternatively, it can be a hand comprising thickened areas over a median area of the flexible segments, for improved viewing of the hand.

The invention further relates to a horological movement 20 comprising at least one such display mechanism 10.

The invention further relates to a timepiece 30 comprising at least one horological movement 20 and/or comprising at least one such display mechanism 10. More particularly, 21 this timepiece 30 is a watch.

The invention further relates to a scientific apparatus comprising at least one horological movement 20 and/or comprising at least one such display mechanism 10.

The invention claimed is:

1. A variable-geometry timepiece display mechanism comprising:

at least one resilient hand which comprises a first drive pipe integral with a first end of a flexible strip, and a second drive pipe integral with another end of said flexible strip, and which comprises a display index or tip which, in an unstressed free state of said resilient hand wherein both said first pipe and said second pipe are not subjected to any stress and are remote from one another, is remote from said first pipe and from said second pipe, the operating position of said resilient hand being a stressed position where said first pipe and said second pipe are coaxial to one another about an output axis; and first means for driving said first pipe about said output axis, and second means for driving said second pipe about said output axis, said first drive means and second drive means being arranged so as to deform said flexible strip by varying the angular position of said second pipe relative to the angular position of said first pipe about said output axis, and so as to vary the radial position of said display index or tip relative to said output axis, whereby said first drive means and/or second stressing means comprise an accelerator or decelerator device, which is arranged such that it accelerates, or stabilizes the speed of, or slows down at least said first pipe and/or said second pipe over at least part of the angular travel thereof, wherein said accelerator or decelerator device comprises a first shaped gear train including a first shaped wheel driven by a first cannon-pinion, the first shaped wheel gears with a second shaped wheel that idles about a first axis, the second shaped wheel being pivotably integral with a third shaped wheel, the third shaped wheel gears with a fourth shaped wheel that pivots about the output axis and comprises a second cannon-pinion attached to the first pipe, wherein said accelerator or decelerator device comprises a second shaped gear train including a fifth shaped wheel driven by the first cannon-pinion, the fifth shaped wheel gears with a sixth shaped wheel that idles about a second axis, the sixth shaped wheel being pivotably integral with a seventh shaped wheel, the seventh shaped wheel gears with an eighth shaped wheel that pivots about the output axis and comprises a third cannon-pinion attached to the second pipe, and wherein each of the first through eighth shaped wheels is non axisymmetric.

2. The mechanism according to claim 1, wherein said resilient hand comprises a plurality of flexible segments that are joined end-to-end at at least one tip forming a display index, a first flexible segment thereof extends between said first pipe and a first tip, and said second pipe, said display mechanism comprising an input wheel set arranged so as to be driven such that it pivots about an input axis by a movement, and which defines an input angle with a reference, and comprising said first means for driving said first pipe about said output axis, and second means for stressing at least said first flexible segment, which are arranged so as to vary the position of at least said first tip relative to said output axis, said first tip being at a variable distance from said first pipe, as a function of forces applied to said flexible strip by said second stressing means, wherein said second stressing means comprise said second means for driving said second pipe in an assembled and stressed state of said resilient hand in which both said first pipe is driven by said first drive means, and said second pipe is driven by said second drive means.

3. The mechanism according to claim 2, wherein said first pipe is advanced or delayed relative to the value of said input angle, which is symmetric to the delay or advance of said second pipe relative to said input angle, such that said first tip always displays, relative to said output axis and said reference, an angle that is equal to said input angle.

4. The mechanism according to claim 1, wherein said first pipe is advanced or delayed relative to the value of said input angle, which is, as an absolute value, different to the delay or advance of said second pipe relative to said input angle, such that said first tip displays, relative to said output axis and said reference, an angle that is variable relative to said input angle throughout the length of the travel thereof.

5. The mechanism according to claim 1, wherein said hand is arranged such that it travels a total non-retrograde path and that, over said total path, an average speed of said first pipe is equal to an average speed of said second pipe.

6. The mechanism according to claim 1, wherein said first drive means and said second stressing means are arranged so as to drive said resilient hand over the entirety of the angular travel thereof about said output axis, and provide it, in projection on a display plane or on a dial, and at different angular positions of said resilient hand, with at least one first shape in which said flexible segments comprised in said flexible strip do not cross paths outside of said first pipe, and at least one second shape in which said flexible segments comprised in said flexible strip cross paths outside of said first pipe.

7. The mechanism according to claim 6, wherein said first shape is an almond shape, and said second shape is a heart shape.

8. The mechanism according to claim 1, wherein said first flexible segment bears said first pipe at a first end, and a second flexible segment joined to said first flexible segment bears said second pipe at a second end, and wherein, in said free state of said resilient hand, said first end and said second end are remote from one another, or form a non-zero angle with one another from said tip at which said first flexible segment and said second flexible segment are joined.

9. The mechanism according to claim 8, wherein said first shaped gear train and said second shaped gear train are arranged such that they symmetrically control said first pipe and said second pipe, such that said first flexible segment and said second flexible segment are symmetrical relative to a radial originating from said output axis and passing by way of said tip at which said first flexible segment and said second flexible segment are joined, over at least part of the angular travel of said resilient hand.

10. The mechanism according to claim 1, wherein the output of said second drive means of said second pipe is coaxial to the output of said first drive means of said first pipe.

11. The mechanism according to claim 1, wherein said first shaped gear train and said second shaped gear train are arranged so as to accelerate or respectively brake said first pipe, and to brake or respectively accelerate said second pipe over only part of the angular travel of said resilient hand.

12. The mechanism according to claim 1, wherein in the free state, said resilient hand extends over a first planar level comprising said first pipe and over a second planar level comprising said second pipe, and comprises a connecting area between said first planar level and said second planar level at one said tip between a first flexible segment bearing said first pipe and a second flexible segment joined to said first flexible segment and bearing said second pipe, and wherein said resilient hand is arranged such that it is mounted in a non-twisted manner in a stressed operating position wherein said first pipe and said second pipe are superimposed on one another.

13. The mechanism according to claim 1, wherein in the free state, said resilient hand extends over as many parallel levels as there are said flexible segments, and is arranged such that it is mounted in a non-twisted manner in a stressed operating position wherein said first pipe and said second pipe are superimposed on one another.

14. The mechanism according to claim 1, wherein in the free state, said resilient hand extends over a single planar level comprising said first pipe and said second pipe, and said resilient hand is arranged such that it is mounted in a twisted manner in a stressed operating position wherein said first pipe and said second pipe are superimposed on one another.

15. The mechanism according to claim 1, wherein in the free state, said resilient hand comprises a divisible element joining said first pipe and said second pipe, said divisible element being separate from the flexible strip and configured to be broken to allow for the passage of said resilient hand into a stressed operating position when said first pipe and said second pipe are superimposed on one another.

16. The mechanism according to claim 1, wherein said resilient hand comprises at least one eye arranged such that it forms an aperture for reading information appearing on a dial (comprised in said mechanism, and in front of which said resilient hand extends, or comprised in a horological movement on which said mechanism is arranged for attachment thereto.

17. The mechanism according to claim 1, wherein said mechanism forms an additional module arranged so as to be connected to a horological movement, and said first drive means and said second stressing means comprise a common input arranged so as to be driven by a single output comprised in said movement.

18. The mechanism according to claim 1, wherein at least one of the first through eighth shaped wheels comprises an incomplete toothing, each missing tooth allowing said resilient hand to relax, by rotation of only one of said pipes, during the passage of the space corresponding to a missing tooth, so as to control a recoil of the tip of said resilient hand.

19. A horological movement comprising:

at least one of the mechanism according to claim 1.

20. A timepiece comprising:

at least one of the horological movement according to claim 19.

21. A scientific apparatus comprising:

at least one of the horological movement according to claim 19.

* * * * *